United States Patent [19]

Zacharias, Jr.

[11] Patent Number: 4,505,160
[45] Date of Patent: Mar. 19, 1985

[54] HIGH-TEMPERATURE TRANSDUCER
[75] Inventor: Ellis M. Zacharias, Jr., Tulsa, Okla.
[73] Assignee: Nusonics, Inc., Tulsa, Okla.
[21] Appl. No.: 464,416
[22] Filed: Feb. 7, 1983
[51] Int. Cl.³ .......................... G01F 1/66; H04R 17/00
[52] U.S. Cl. .................................. 73/861.18; 310/327; 310/336; 367/162
[58] Field of Search ................. 73/861.18, 644, 632; 310/336, 327, 329; 367/157, 162, 165

[56] References Cited
U.S. PATENT DOCUMENTS

| Re. 29,785 | 9/1978 | Leschek | 73/644 X |
| 3,233,465 | 2/1966 | Tolliver | 310/329 X |
| 3,241,373 | 3/1966 | Ricketts | 310/329 X |
| 3,935,484 | 1/1976 | Leschek | 310/327 |
| 3,973,152 | 8/1976 | Karplus | 310/327 |
| 4,417,480 | 11/1983 | Zacharias, Jr. | 73/861.18 |

Primary Examiner—Charles A. Ruehl
Attorney, Agent, or Firm—Head, Johnson & Stevenson

[57] ABSTRACT

A high-temperature transducer for transmitting and/or receiving sonic energy having a housing with a cylindrical opening, a metallic acoustic window element closing one end of the opening, a cylindrical transducer crystal having one planar surface in engagement with the acoustic window rearward face, a cylindrical dampening member in contact with the crystal rearward face, a first and a second thrust disc received in the cylindrical opening with a thrust transmitting sphere between the discs, and a thrust producing compression screw threadably received in the cylindrical opening supplying pressure against the first of the thrust discs which pressure is applied by means of the sphere to the second thrust disc, to the dampening means and to the crystal rearward face to force the crystal into intimate engagement with the acoustic window for effective sound transmission.

11 Claims, 7 Drawing Figures

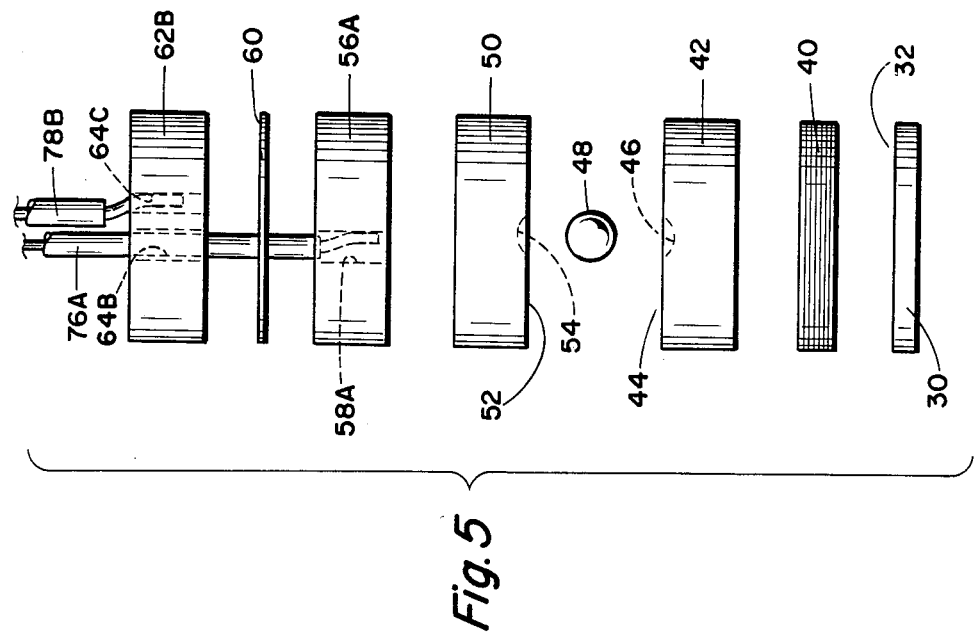
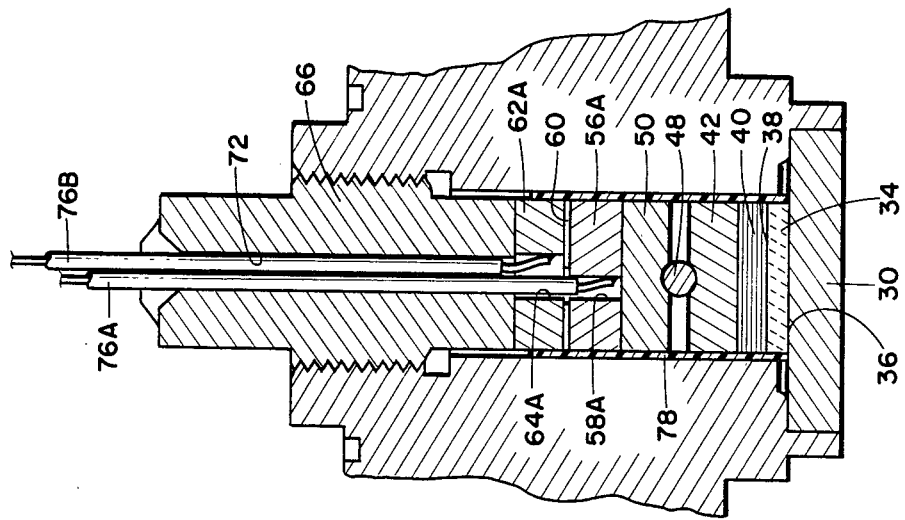
Fig. 5
Fig. 4

HIGH-TEMPERATURE TRANSDUCER

SUMMARY OF THE INVENTION

The use of sonic transducers is well known. A common application is in flow meters wherein sound is transmitted in the path of fluid flow. By measuring changes in the speed of sound, the rate of flow can be determined. Sonic transducers are used to measure the height of fluid in a vessel, for locating underwater fish and other objects and for a wide range of other purposes. A particular application of the use of sonic energy is to monitor the properties of molten plastic material in an injection molding machine or extruder. For this purpose the transducer must be positioned so that the sonic energy emanating from the transducer is coupled directly to the molten plastic material. Transducers may be used singly wherein a reflective surface is provided so that the same transducer both transmits and receives sonic energy or transducers may be arranged in pairs so that they talk to each other through the molten plastic material.

By transmitting and receiving sonic energy in molten plastic material, the characteristics of the molten plastic can be measured and departures from established norms can be expeditiously detected. This can be accomplished in a variety of ways. For instance, the velocity of sound travel in the molten plastic is an indicator of the modulus of elasticity of the plastic if the density is known. In addition, by measurement of sound energy loss, that is, absorption or attenuation, characteristics of the molten plastic can be monitored.

One difficulty in using transducers in this application is that they must be exposed to extremely high temperatures. A second problem with the application of transducers for this purpose is that they must be sealed effectively to prevent entrance of molten plastic material into the interior of the transducer, yet in a manner which does not employ elastomers or other type of gasket arrangements which would be destroyed by the high temperatures to which the transducers are subjected.

The present invention provides a transducer which may be used in a wide variety of applications but which is particularly adaptable for use in harsh environments such as those encountered in monitoring the flow rate of liquid plastic or the properties of the plastic. The transducer of this invention includes a housing having a cylindrical opening in it. Closing one end of the opening is a metallic acoustic window. In the preferred embodiment this window is welded into place, thereby preventing leakage of fluid or gases into the interior of the transducer. The metal acoustic window has a rearward surface within the tubular opening. In contact with this rearward surface is a cylindrical crystal, such as a piezoelectric element having a forward face and a rearward face. In order to achieve efficiency in the transmission of sonic energy from the crystal element to the acoustic window, the faces of these two elements must be in secure, intimate contact. Any deviation which causes gaps or low pressure areas of contact between the crystal element and the acoustic window will impair the effectiveness and efficiency of the transducer.

Rearwardly of the crystal element within the cylindrical opening is a dampening means which preferably is in the form of a plurality of cylindrical washers made of non-ferrous metal such as copper, brass, or the like. Rearwardly of the absorption member are elements whose function it is to apply pressure against the absorption member and thereby the crystal to ensure intimate contact between the crystal and the acoustic window. In the present invention these elements include a first cylindrical thrust imparting disc which engages the absorption member and a second thrust imparting disc. Each of the thrust imparting discs has a small depth recess in one end surface coincident with the cylindrical axis. A thrust imparting sphere is positioned between the discs and in the recesses. A means is provided of applying force against the rearward-most thrust imparting disc. In the preferred arrangement the rearward portion of the cylindrical opening is internally threaded and an externally threaded compression screw is received in the threaded opening. The inner end of the screw engages the thrust discs by way of electrical contact washers as the member is threadably advanced, forcing the crystal element into contact with the acoustic window rearward face. The thrust transmitting sphere allows application of force so that defects arising from machining tolerances in the device are compensated for, and thereby the thrust is equally applied to the full rearward face of the crystal element to achieve maximum effective force distribution of the crystal element forward face against the acoustic window rearward face.

The invention also provides improved means of providing electrical connection of conductors between the crystal forward and rearward faces so that electrical energy may be effectively coupled to or received from the crystal element.

For additional background information and for samples of sonic transducers of the type to which the present invention applies, reference may be had to the following U.S. Pat. Nos. 3,771,117; 3,890,423; 3,935,484; 3,973,152; 4,240,004; 4,331,025; and 4,365,518.

BRIEF DESCRIPTION OF THE DRAWINGS

FIG. 4 is an external view of an alternate embodiment of the invention and including means of making electrical connection of conductors with elements within the transducer.

FIG. 5 is an exploded view of the internal elements of the transducer of FIG. 4.

DETAILED DESCRIPTION

Figure 1:
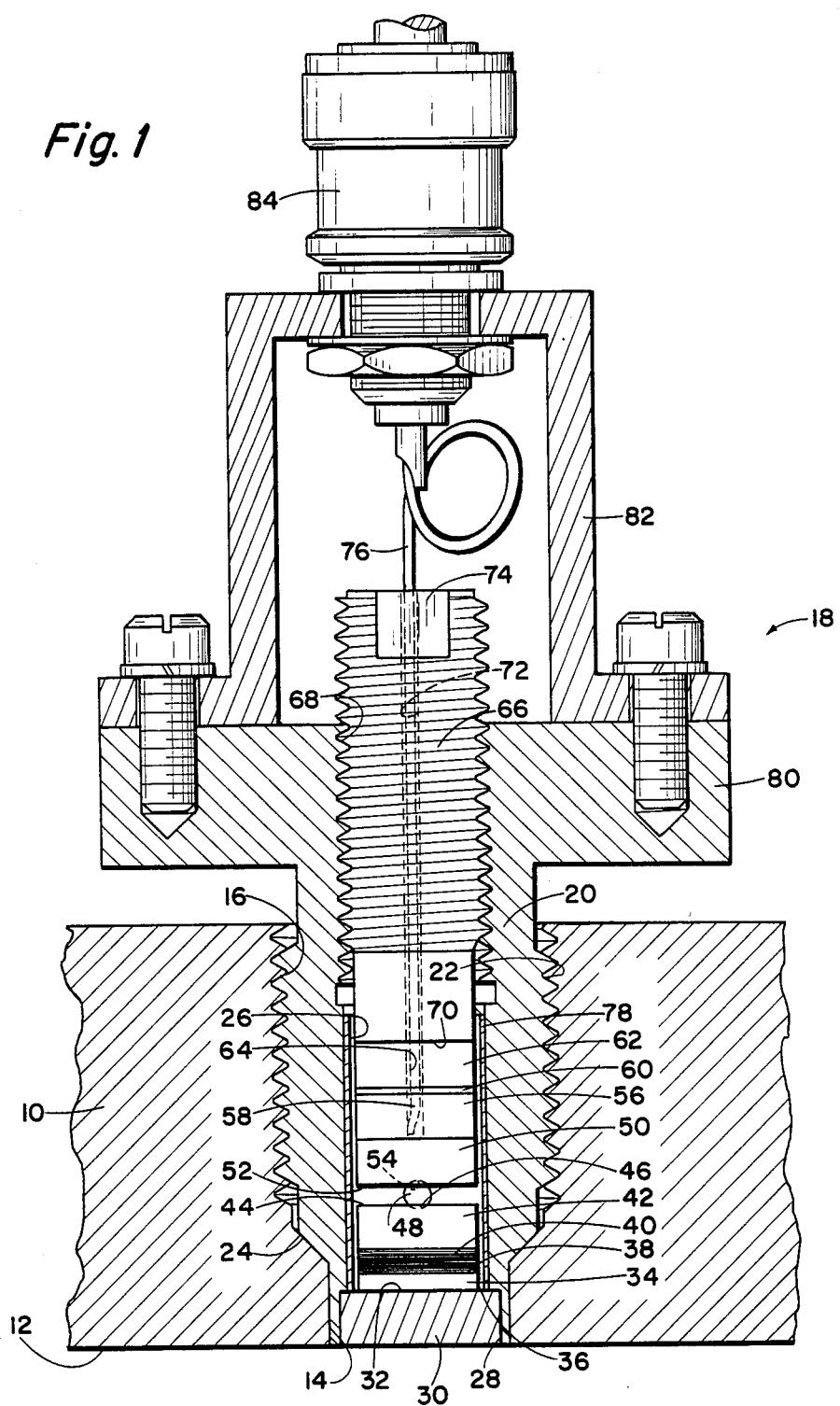
FIG. 1 is a cross-sectional view of one embodiment of the invention in which the transducer housing is received in an internally threaded opening formed in a device, such as a plastic extruder. The transducer housing is provided with a removable bonnet for the attachment of an electrical connector to the transducer.

Referring now to the drawings and first to FIG. 1, an embodiment of the invention is illustrated. The invention, as has been previously mentioned, may be employed such as in monitoring molten plastic as it flows through an extruder; and in such application, the extruder housing is indicated by the numeral 10 with the flow passageway for the liquid plastic indicated by the numeral 12. The housing 10 has an opening 14 which communicates with the flow passageway 12, the outward portion of the opening 14 being of enlarged internal diameter and threaded at 16. The transducer is generally indicated by the numeral 18 which includes a cylindrical body 20 having external threads 22. The exterior configuration of the transducer body 20 is configured to sealably engage the opening 14 in housing 10 including the provision of an internal shoulder 24.

The transducer body 20 has a cylindrical opening 26 which receives the elements making up the operative part of the transducer. The inward end of cylindrical opening 26 is of enlarged diameter at 28 and receives an acoustic window element 30. The element 30 is formed of material which is highly conductive of sonic energy, such as of metal. In addition, the acoustic window 30 must withstand the high temperatures and high pressures to which the housing 10 is subjected, such as is encountered when the device is used to monitor molten plastics flowing through passageway 12. The acoustic window 30 is preferably welded in position in opening 28 to thereby form a sealed closure of the lower end of the interior of cylindrical opening 26.

The acoustic window 30 has a planar rearward surface 32. Positioned in contact with this surface is a cylindrical transducer crystal element 34 having a forward planar surface 36 and a rearward planar surface 38. It is extremely important that the crystal element forward surface 36 have intimate contact with the acoustic window rearward surface 32 in order to achieve efficient acoustic coupling of these two elements. The pressure of contact of these surfaces must not only be such as to eliminate the possibility of voids but the pressure needs to be evenly distributed over the entire surface areas. An important aspect of this invention is the provision of means to achieve such equal pressure distribution.

The next element in the assembly is a cylindrical dampening member 40. While the dampening members of a variety of materials and configurations have been employed in transducers, an effective dampening means is the use of a plurality of thin discs of non-ferrous metal such as brass or copper. In a typical embodiment, the dampening member 40 may be made up of approximately 20 thin, non-ferrous metal discs.

Rearwardly of the dampening member is a first thrust disc 42 which has, on its rearward surface 44, a small diameter recess 46, the recess being coincident with the cylindrical axis of the disc.

Next is a thrust transmitting sphere 48 which is formed of very hard electrically conductive material, as INCONEL 625 high-temperature alloy, "INCONEL" being a trademark of International Nickel Company. A second thrust disc 50 is of the same configuration as first thrust disc 42, that is, in its forward face 52 there is a small diameter recess 54 coincident with the disc cylindrical axis, the recess 54 receiving the thrust transmitting sphere 48.

Rearwardly of the second thrust disc 50 is an electrical contact washer 56 having an axial opening 58 therethrough. In contact with the rearward surface of the electrical contact washer 56 is an insulator 60 which may be formed of material such as mica. The insulator must resist flow under the pressure and temperature to which the transducer is subjected.

Contacting the insulator is a second washer 62 having an axial opening 64 therethrough. Rearwardly of the washer 62 is an externally threaded compression screw member 66. This member is received in the upper internally threaded portion 68 of the cylindrical opening 26 in transducer body 20. The lower end face 70 of the compression screw engages washer 62, the end face being perpendicular the longitudinal axis of the compression screw. An axial opening 72 extends through the compression screw. A wrench flat 74 is formed on the exterior outer end to afford means of rotation of the screw. Received in the axial openings provided in elements 56, 60, 62, and 66 is an insulated conductor 76. The bare or exposed end of the insulated conductor is attached to the electrical contact washer 56. Received within the cylindrical opening 26 in the transducer body is a tubular insulating member 78. Conductor 76 thereby provides an electrical path to the rearward surface 38 of the crystal element 34.

Formed integrally as a part of the outer end of the body 20 is a flange portion 80 which receives a cylindrical bonnet member 82. An electrical connector 84 is attached to the bonnet portion and provides means for connecting a cable having continuity with the insulated conductor 76. The purpose of the bonnet portion 82 is to afford means of attaching an electrical connector at sufficient spacing so as to reduce the possibility of overheating of the electrical connector 84.

As previously indicated, it is extremely important that the pressure contact of the crystal element 34 with the acoustic window 30 be maintained at all temperatures to which the transducer is subjected. This is accomplished by inwardly threading the compression screw 66. The force applied by the compression screw is transmitted through the washer 62, insulator 60, electrical contact washer 56, second thrust disc 50, thrust transmitting sphere 48, first thrust disc 42, and dampening member 40 to the crystal element 34. Any misalignment or machining tolerances in manufacturing the various elements making up the transducer are compensated for by the thrust transmitting sphere 48. In this manner the pressure applied against the crystal member rearward surface 38 is transmitted evenly over the entire area of the crystal forward surface 46 and acoustic window rearward surface 32. It should also be noted that the force is transmitted throughout in a linear path and with only a single force adjustment which is accomplished by the rotation of compression screw 66.

Figure 6:
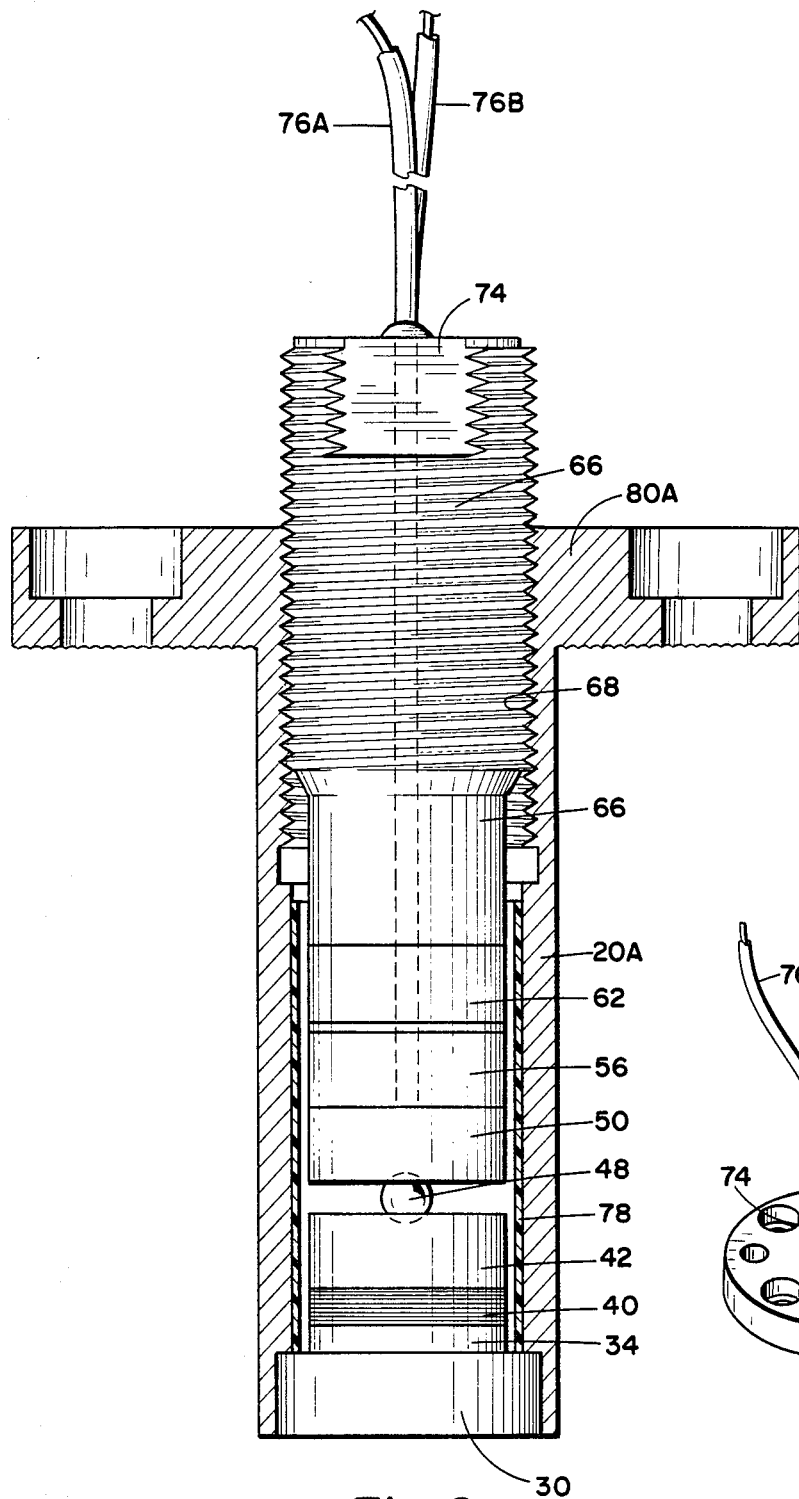
FIG. 6 is a cross-sectional view of an alternate form of housing as employed in providing a transducer according to this invention, the internal elements being essentially as illustrated in FIG. 5.
Figure 7:
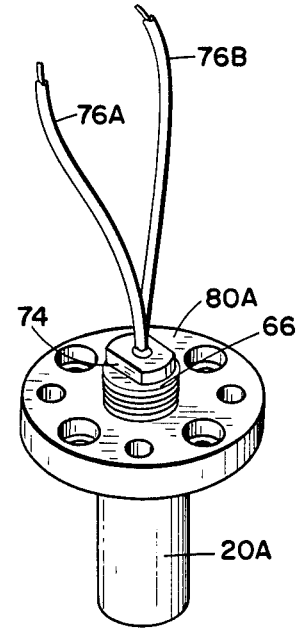
FIG. 7 is an external isometric view in reduced scale of the embodiment of FIG. 6.

FIGS. 6 and 7 show an alternate embodiment of the invention, the difference being in the configuration of the housing which is designated by 20A in FIGS. 6 and 7. The housing 20A has an integral flange portion 80A. The housing is not externally threaded as in FIGS. 1, 2, and 3 but is cylindrical so as to be received in a location in which the housing is secured by means of bolts extending through the flange portion 80A. FIGS. 6 and 7 are exemplary of the fact that the external arrangement of the transducer may vary considerably without departing from the basic concepts of the invention.

Figure 3:
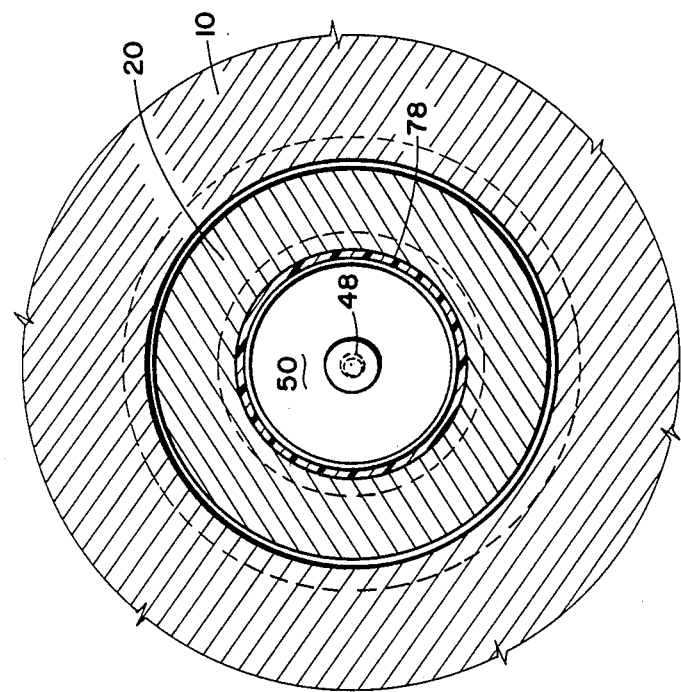
FIG. 3 is a cross-sectional view taken along the line 3—3 of FIG. 2.
Figure 2:
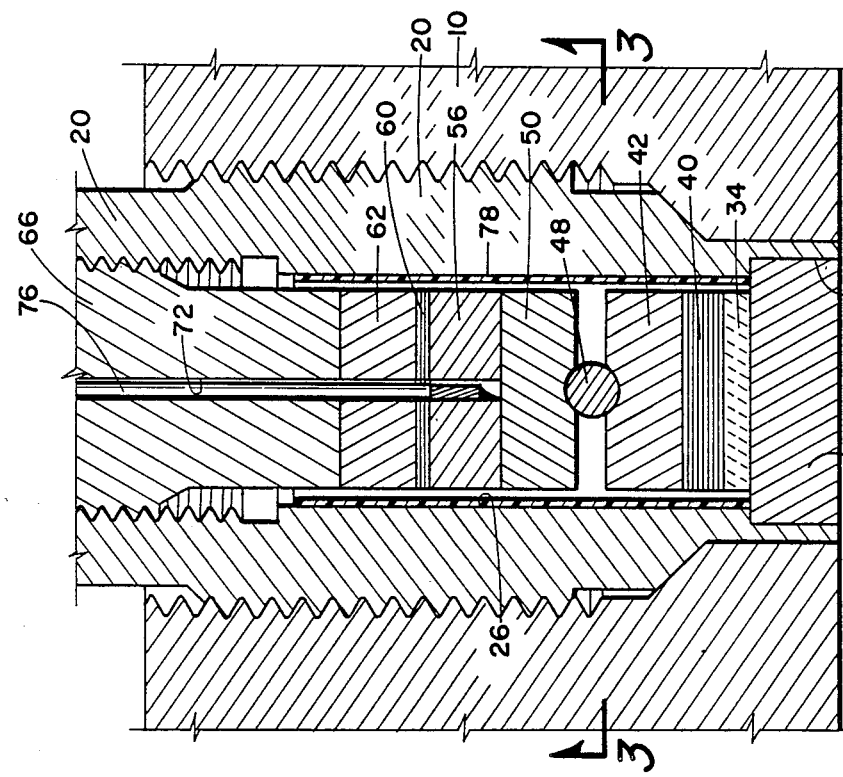
FIG. 2 is an enlarged partial view as shown in FIG. 1 and showing the essential elements of the transducer in greater detail.

In the arrangement of FIGS. 1, 2, and 3, the electrical circuit is formed by a single conductor 76, with the housing forming the ground or other conductor, that is, the housing communicates electrically with the forward surface 36 of the crystal element, and conductor 76 connects to the rearward surface 38.

FIGS. 4 and 5 illustrate an alternate embodiment wherein parallel conductors are employed to communicate with the crystal rather than utilizing the housing for that purpose as was described with reference to the embodiments of FIGS. 1, 2, and 3. In this embodiment, referring now specifically to FIGS. 4 and 5, the elements having the same numbers perform the same functions and are generally constructed as described with reference to FIGS. 1, 2, and 3. The primary difference resides in the construction of the electric contact washer 56A and the washer disc 62A which also serves as an electrical contact. In the embodiments of FIGS. 4 and 5 the opening 58A in the electrical contact washer is offset slightly from the member cylindrical axis. In FIG. 4 the opening 64A in the washer 62A is of enlarged diameter. A first insulated conductor 76A has the bare end affixed to the electrical contact washer 56A within the recess 58A. This may be accomplished by welding the bare end to the member within the recess. A second conductor 76B is employed having the bare end welded to the washer 62A within the recess 64A. The tubular insulator 78 extends from the acoustic window 30 to a height at least past the insulator washer 60. It can be seen that conductor 76A is in electrical contact with the crystal element rearward surface 38 by continuity through the electrical contact washer 56A, second thrust disc 50, thrust transmitting sphere 48, first thrust disc 42, and dampening member 40. Conductor 76B is in electrical continuity with the forward face 36 of crystal element 34 through washer 62A, compression screw 66, housing 10, and acoustic window 30. Whether a single conductor is employed as in FIGS. 1, 2, and 3, or two conductors are employed as in FIGS. 4 and 5, the operation of the transducer is the same.

In FIG. 5, the arrangement of electrical contact washer 62B is modified slightly. Instead of an enlarged diameter opening as in electrical contact washer 62A in FIG. 4, two separate openings 64B and 64C are employed. Opening 64B is coincident with opening 58A in first electrical contact washer 56A and receives conductor 76A. A separate opening 64C receives the bare end of conductor 78B which is welded to the washer within the opening. Conductor 76B need not be insulated since it, in effect, connects to ground, that is, to the transducer body 20 and housing 10.

The invention provides an improved transducer for transmitting and receiving sonic energy for use in high-temperature, high-pressure environments. The superior benefits of the transducer herein described are achieved by the provision of means of ensuring equal application of contact pressure of the crystal element with the acoustic window regardless of machining defects, and in an arrangement wherein the transducer is sealed against the entrance of fluids or gases without the use of elastomeric or other type compression fittings.

In addition, force is applied to ensure proper contact pressure between the crystal element and acoustic transducer by the provision of a single, threadably advanced compression screw.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed:

1. A transducer for transmitting and/or receiving sonic energy comprising:
   a housing having a cylindrical opening having a forward end and rearward end, the cylindrical opening being internally threaded in the rearward portion;
   an acoustic window member sealably closing the forward end of said cylindrical opening, the acoustic window having a planar rearward face;
   a cylindrical transducer crystal element having a forward planar face in engagement with said acoustic window rearward face, and an opposed rearward face;
   an externally threaded compression screw in said internally threaded portion of said cylindrical opening rearwardly of said transducer crystal element for applying force against said transducer crystal element rearward face to cause intimate contact of said transducer crystal element forward face and said acoustic window rearward face, such force being symmetrically applied by said compression screw axially of said cylindrical transducer crystal element;
   a thrust transmitting sphere in the path of said axially applied force serving to ensure uniform load of force of said transducer crystal element against said acoustic window; and
   means of providing separate electrical paths between said transducer crystal element forward and rearward faces.

2. A transducer according to claim 1 including:
   a cylindrical dampening member rearwardly of said transducer crystal element and in contact with said rearward face thereof, said dampening member being in the path of said symmetrically applied axial force against said transducer crystal element.

3. A transducer according to claim 2 wherein said cylindrical dampening member is in the form of a plurality of thin cylindrical discs.

4. A transducer according to claim 3 wherein said cylindrical discs are formed of non-ferrous metal.

5. A transducer according to claim 1 including a first and a second cylindrical thrust imparting disc, each disc having a recess in one surface of its cylindrical axis, said discs being positioned within said cylindrical opening between said compression screw and said transducer crystal element with their axii in the path of force applied by said compression screw and said thrust transmitting sphere being positioned between the discs and received in the recesses therein.

6. A transducer according to claim 1 including an insulating sleeve within said cylindrical recess surrounding said transducer crystal element and portions of said compression screw having electrical continuity with said transducer crystal element rearward face.

7. A transducer according to claim 6 including
   an electrical contact washer within said cylindrical recess and positioned between said transducer crystal element rearward face and said compression screw, the washer having an opening therethrough and said compression screw having a longitudinal opening therein; and
   an insulated conductor having one end connected to said electrical contact washer and the other end extending externally of the transducer through said compression screw longitudinal opening.

8. A transducer according to claim 7 including a second electrical contact washer within said cylindrical recess and positioned between said first-mentioned electrical contact washer and said compression screw, said second electrical contact washer having an opening therein receiving said conductor attached to said first-mentioned electrical contact washer;

a second conductor received in said compression screw longitudinal opening, one end of the second conductor being attached to said second washer;

means providing electrical continuity between said second electrical contact washer, said housing, said acoustic window member and thereby to said transducer crystal element forward face; and an insulating washer between said first and second electrical contact washers.

9. A transducer according to claim 1 wherein said acoustic window is metallic and is welded in position in said cylindrical opening.

10. A transducer for transmitting and/or receiving sonic energy comprising:

a tubular body having a forward end and a rearward end, the rearward end portion being internally threaded;

a metallic acoustic window element sealably closing the forward end of said tubular body and having an inner planar surface;

a cylindrical crystal element of external diameter less than the internal diameter of said tubular body, having opposed planar end surfaces, one of which is in contact with said acoustic window inner planar surface;

cylindrical dampening means having one surface in engagement with the other of said crystal element end surfaces;

a first cylindrical disc having a planar end surface which is in engagement with said dampening means, the opposite surface having a recess therein coincident with the disc cylindrical axis;

a second cylindrical disc having one end surface with a recess therein coincident with the disc cylindrical axis, and having an opposite end surface;

a thrust transmitting sphere received in said disc recesses;

an externally threaded compression screw threadably received in said tubular body rearward portion, which screw can be rotated to apply direct axial pressure against said second disc, which force is transmitted by said sphere to said first disc and thereby to said dampening means and said crystal element; and means establishing separate electrical conductive paths to said opposed crystal element end surfaces.

11. A transducer for transmitting and/or receiving sonic energy comprising:

a housing having a cylindrical opening having a forward end and rearward end;

an acoustic window member sealably closing the forward end of said cylindrical opening, the acoustic window having a planar rearward face;

a cylindrical transducer crystal element having a forward planar face in engagement with said acoustic window rearward face, and an opposed rearward face;

means in said cylindrical opening rearwardly of said transducer crystal element for applying force against said transducer crystal element rearward face to cause intimate contact of said transducer crystal element forward face and said acoustic window rearward face, such force being symmetrically applied axially of said cylindrical transducer crystal element;

a thrust transmitting sphere in the path of said axially applied force serving to ensure uniform load of force of said transducer crystal element against said acoustic window;

a first electrical contact washer within said cylindrical recess in engagement with said transducer crystal element rearward face, the washer having an opening therethrough and said force applying means having a longitudinal opening therein;

a second electrical contact washer within said cylindrical recess and positioned between said first electrical contact washer and said force applying means, said second electrical contact washer having an opening therein;

a first and second conductor received in said force applying means longitudinal opening, the first conductor being attached to said first electrical contact washer and the second conductor being attached to said second electrical contact washer, electrical continuity being provided between said second electrical contact washer, said housing, said acoustic window member and thereby to said transducer crystal element forward face; and an insulating washer between said first and second electrical contact washers.

* * * * *